March 3, 1931.  D. A. CUMFER  1,794,674
METHOD AND APPARATUS FOR MAKING ROOFING MATERIALS
Filed Oct. 26, 1929
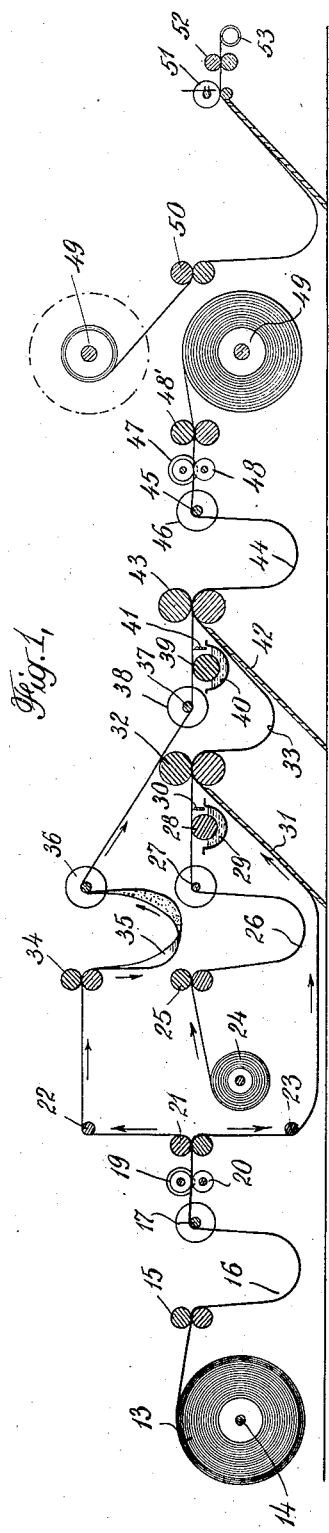
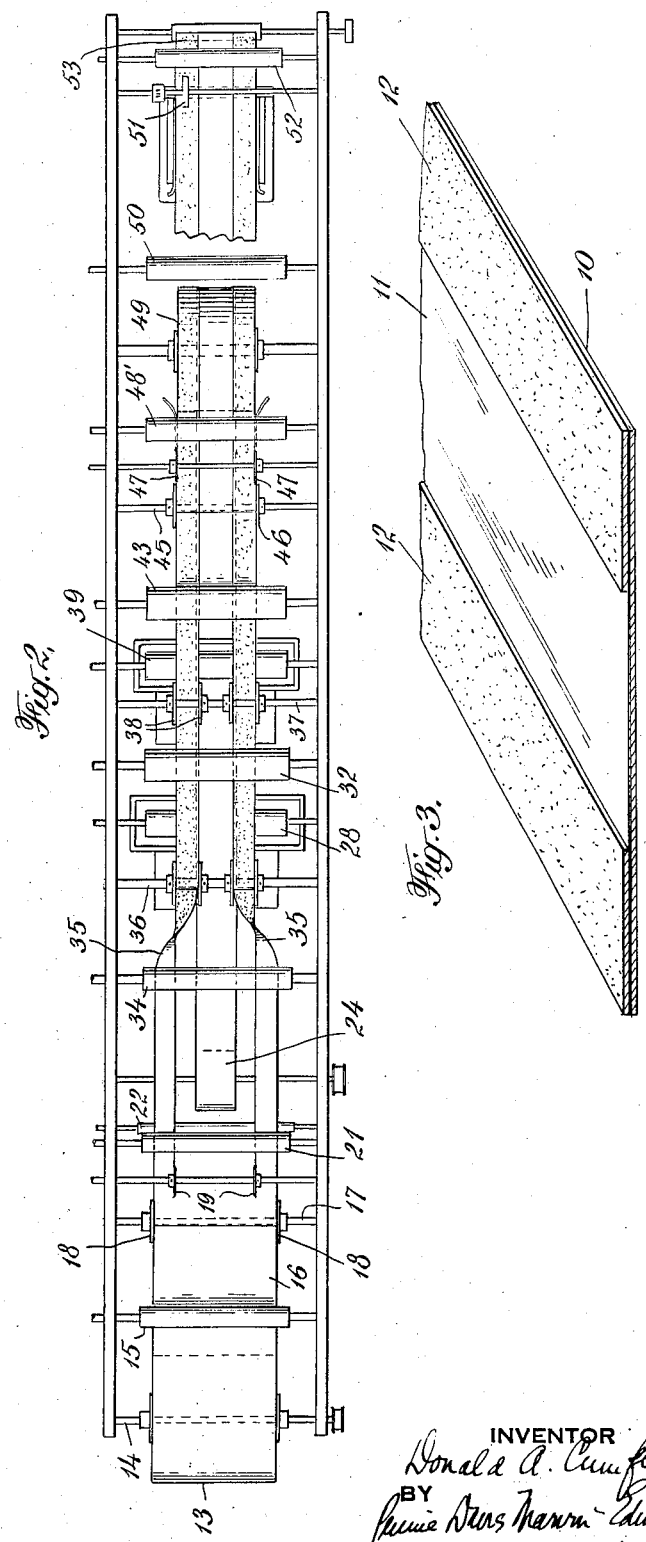
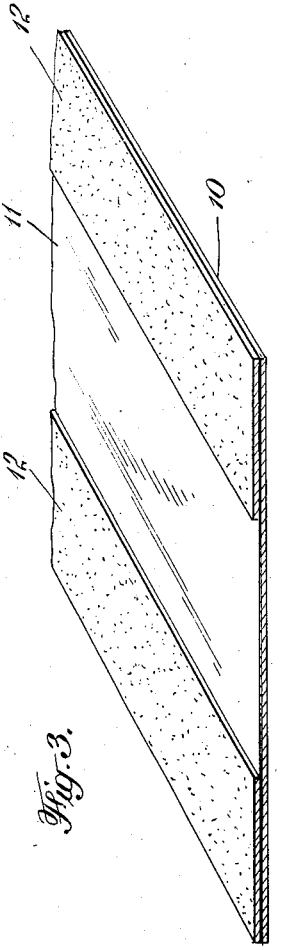
INVENTOR
Donald A. Cumfer
BY
ATTORNEYS Patented Mar. 3, 1931

1,794,674

UNITED STATES PATENT OFFICE.

DONALD A. CUMFER, OF NUTLEY, NEW JERSEY, ASSIGNOR, BY MESNE ASSIGNMENTS, TO ANACONDA SALES COMPANY, OF NEW YORK, N. Y., A CORPORATION OF DELAWARE

METHOD AND APPARATUS FOR MAKING ROOFING MATERIALS

Application filed October 26, 1929. Serial No. 402,624.

This invention relates to the manufacture of roofing material and is concerned more particularly with a method and apparatus for producing a roofing material of the type illustrated and described in the co-pending application of Shakespeare, Serial Number 343,743, filed March 1, 1929.

The material of the Shakespeare application is intended primarily for use as a flashing or in valleys and it comprises a base or web of thin felt to one face of which is affixed a band or strip of relatively thin metal which is resistant to corrosion. The metal band is narrower than the base and is applied along the median line thereof. In order to strengthen the product and to prevent the seepage of water between the base and metal, additional strips of base material are affixed to the marginal edges of the base in such manner as to overlie the edges of the metal.

The method and apparatus of this invention may be employed for the manufacture of this material at a low cost and with a relatively high output rate. According to the new method, a felt web having a width equal to that of the base plus the two additional strips to be laid on the base to overlap the metal, is placed in motion and is acted on at one point in its travel by suitable slitting means to sever the strips therefrom along the edges. These strips are separated from the web and then without interruption in their travel are shifted toward each other to lie over the edges of the web but spaced therefrom. A metal band of the proper width lies between the web and strips and it is continuously drawn from a supply, coated on one face and then applied to the face of the web and affixed by pressure. The strips also receive a coating on their undersurfaces in their movement and they are laid progressively on the web along its edges and affixed by pressure. The material is finally trimmed along its edges, and wound upon a take-up arbor to form a roll which is later unwound and cut into lengths suitable for commercial purposes.

For a better understanding of the invention, reference may be made to the accompanying drawings, in which Figure 1 is a view in longitudinal section of apparatus for practising the method of the invention;

Fig. 2 is a plan view thereof, and

Fig. 3 is a view in perspective of the product.

The product produced by the method and apparatus of this application comprises a felt base 10, to one surface of which is affixed a band 11 of thin metal, this band being of substantially less width than the base and covering a central zone on the base beyond which project selvage edges. Affixed to the base along these edges are strips of felt 12. The width of these strips is slightly greater than the width of the selvages of the base, so that each strip overlies one edge of the metal band to a slight degree.

In making this material according to the method of the present invention, there is employed a web of felt 13, the width of which is equal to the width of the base 10 plus the widths of the two strips 12 which are affixed to the base. This felt web in the form of a roll is mounted on an arbor 14 and led through a pair of draw rolls 15 driven in any suitable manner. Beyond the draw rolls the felt is looped downwardly as at 16 and then passes over a guide roll 17, this roll carrying discs 18 which engage the edges of the web and guide the web in its forward movement. Beyond the guide roll 17 the web passes through a slitting device which includes a pair of slitting discs 19 and a roll 20 cooperating with the discs. These discs slit the web lengthwise to sever strips 12 from the main body of the web along the edges thereof. Beyond the slitting device the web and strips pass through a pair of draw rolls 21 which advances them at the same speed and beyond the rolls the strips are led upwardly and around an idler roll 22, while the main body of the web passes downwardly and around an idler roll 23. The idler rolls 22 are spaced apart a substantial distance and in the space between the strips and the main body of the web is mounted a supply of the metal band in the form of a roll 24 mounted on a suitable arbor.

The metal band is drawn from the roll by draw rolls 25 beyond which the band is looped downwardly, as at 26, and then passed over a guide roll 27 having discs for engaging the edges of the band. Beyond the guide roll the band passes over a coating roll 28 which lies partly beneath the surface of an adhesive material in a vat 29. The band contacts with the surface of the roll 28 and as the band moves along, the roll rotates so as to carry the adhesive material out of the vat up against the under surface of the band which is thus given a coating of the adhesive. The felt used as the base material in the new product is of the asphalt-impregnated type and hot asphalt is used as the adhesive. The thickness of the coating of asphalt on the under surface of the band is controlled by means of a doctor blade 30 mounted for adjustment toward and away from the surface of the band, the proximity of the edges of the doctor to the band determining the amount of coating material that will adhere to the band and be carried along with it. Excess coating material scraped off by the doctor falls back into the vat 29.

The main body of the web, after passing around the idler roll 23, advances to a sloping surface 31 which directs the web to a pair of pressure rolls 32. The web and the coated band pass through these rolls together, the coated surface of the band contacting with the upper surface of the web so that the application of pressure applied by the rolls 32 forces the band into intimate contact with the surface of the web to which the band then becomes affixed by means of the asphalt coating. Beyond the pressure rolls 32 the metal-clad web passes downwardly in a loop 33.

The strips 12 slit from the web and passing around the idler roll 22, are drawn through draw rolls 34, beyond which the two strips pass downwardly in loops 35. In the loops the webs are twisted through a half turn and shifted toward each other. The twisting of the strips in the loops serves two purposes. Ordinarily the felt material used for the flashing product is impregnated with asphalt and also coated on one face, and it is preferable to apply the metal to the uncoated face of the web so that the asphalt coating will protect that face not protected by the metal. Accordingly, the web is drawn from the roll 13 in such manner that the asphalt coating is on the under surface. As the outer faces of the strips in the finished product are not protected by metal, these strips should be applied to the web in such manner that the asphalt coatings are outermost. Consequently, in the loop 35 the strips are given the half turn and they are brought out of that turn with the desired lateral shift to bring the strips directly over the edges of that portion of the web which remains after the strips have been cut therefrom. Passing from the web, the two strips are directed between guide discs 36 on a suitable roller and the strips are then led beneath a roller 37 which carries guide discs 38. Beyond the roller 37 two strips pass over the surface of the roller 39 which dips into adhesive in a vat 40. The roller 39 picks up adhesive from the vat and applies it to the under surface of each strip. Excess coating material is scraped from the under surface of each strip by an adjustably mounted doctor blade 41, the excess material returning to the vat.

The metal-clad web passes out of the loop 33 and up an inclined surface 42 to pressure rolls 43, the strips and web passing through the rolls together so that the strips are pressed against the web and affixed firmly thereto. Beyond the pressure rolls 43, the web with the metal band and strips affixed thereto is looped, as at 44, and then passed upwardly and over a roll 45 carrying spaced guide discs 46. Beyond this roll the product passes through a slitting device comprised of slitting discs 47 with a cooperating roll 48. These discs serve to trim the edges of the product and give it the proper finish. Beyond the trimming device the completed material passes through draw rolls 48 and is then wound on an arbor 49. There is a pair of these arbors mounted one above the other, so that while the completed material is being wound on one arbor, the material previously wound on the other may be taken off therefrom by draw rolls 50 and drawn through a measuring device 51 by feed rolls 52. The material is wound on a rewind reel 53 in suitable commercial lengths. The measuring wheel provides a convenient means for winding a roll of the desired length on the reel 53 and when such a roll is finished it is cut from the main web supply, removed from the reel and packaged in the usual way.

In accordance with this method, the several steps of cutting the strips, coating the metal band, applying it to the web and coating the strips and applying them to the webs, so as to overlie the metal band, are carried on continuously and without interruption in the movement of the web and strips so that the product can be made cheaply and at a relatively high output rate. The apparatus used for the purpose is simple and requires few attendants.

What I claim:

1. A method of making a building product which comprises moving a web endwise and without interrupting the movement of the web cutting strips from the web along its edges and advancing said strips at the same speed as the web, progressively affixing a metal band to the surface of the moving web, and progressively shifting said strips over the web and affixing said advancing strips to the web along the edges thereof.

2. A method of making a building product which comprises moving a web endwise and without interrupting the movement of said web continuously severing strips from the web along its edges, advancing said severed strips at the same speed as the web, coating one face of a metal band, progressively affixing the band to the moving web by means of the coating, applying an adhesive coating to one face of each strip, and shifting the moving strips laterally over the web and affixing them to the web along the edges of the latter by means of the coating.

3. A method of making a building product which comprises moving a web endwise and without interrupting the movement of the web continuously severing strips from the web along its edges and maintaining the strips in motion at the same speed as the web, affixing a metal band progressively to the surface of the web, shifting the moving strips toward each other, coating one face of each strip, placing the strips with their coated faces in contact with the web along its edges, and progressively applying pressure to the web and strips to cause them to adhere.

4. A method of making a building product which comprises severing strips from a moving web along the lateral edges thereof, advancing said severed strips at the same speed as the web, affixing a metal band to the moving web along its median line, the band being narrower than the web, coating one face of each strip, laying the moving strips on the web at each side of the metal with the coated faces of the strips in contact with the web, and applying pressure to the strips and web to cause them to adhere.

5. A method of making a building product which comprises moving a web coated on one face in an endwise direction, severing a strip from each edge of the web, advancing said severed strips at the same speed as the web, affixing a metal band to the uncoated face of the web, turning each severed strip through a half turn and shifting the strips toward each other without interrupting their advance, and affixing the strips to the web along the edges of the latter, the coated surface of the web and of each strip being exposed in the completed product.

6. Apparatus for producing a material suitable for building and other purposes which comprises means for drawing a web from a supply and moving it endwise, a cutting device for severing strips from the web along the edges thereof, means for affixing a metal band to one surface of the web, means for advancing said severed strips at the same speed as the web and shifting the strips toward each other and to a position overlying the web, and means for affixing each strip to said surface of the web from which it is cut along the edge of said web while the strips and web are in movement.

7. Apparatus for producing a material suitable for building and other purposes which comprises means for severing strips from a web, means for progressively affixing a metal band to one face of the web, means for advancing said severed strips at the same speed as the web, and shifting the strips toward each other to overlie the edges of the band, and means for progressively affixing the strips to the web from which they are cut along the edges of said web.

8. Apparatus for producing a material suitable for building and other purposes which comprises means for severing strips from a web, means for applying an adhesive coating to one surface of a metal band, pressure means for progressively affixing the band to the web by means of the coating, means for advancing said severed strips at the same speed as the web and shifting the strips toward each other to a position over the web, and means for progressively affixing the strips to the web from which they are cut in position to overlie the edges of the band.

9. Apparatus for producing a material suitable for building and other purposes which comprises means for drawing a web from a supply and maintaining it in endwise movement, a cutting device for severing a strip from each lateral edge of the web, means for drawing a metal band from a supply and moving it endwise, means for coating one face of the band with an adhesive, pressure means for affixing the band to the web by means of the adhesive, means for advancing the strips at the same speed as the web and shifting the strips toward each other, means for coating one face of each web, and pressure means for affixing each strip to the web from which it is cut by means of the coating, each strip extending along an edge of said web and overlying an edge of the band.

10. Apparatus for producing a material suitable for building and other purposes which comprises means for drawing a web coated on one face from a supply and moving it endwise, means for severing a pair of strips from the web, one along each edge, means for advancing the strips at the same speed as the web and twisting the strips half a turn to place the uncoated face of each strip in opposition to the uncoated face of the web from which it is cut, means for affixing a metal band to the uncoated face of the web, and means for affixing the strips to said web in position to overlie the band along its edges.

In testimony whereof I affix my signature.

DONALD A. CUMFER.